United States Patent
Sternby et al.

(10) Patent No.: US 11,829,468 B2
(45) Date of Patent: Nov. 28, 2023

(54) NEURAL NETWORK CONFIDENTIALITY

(71) Applicant: Telefonaktiebolaget LM Ericsson (publ), Stockholm (SE)

(72) Inventors: Jakob Sternby, Lund (SE); Björn Johansson, Bjärred (SE); Michael Liljenstam, Sunnyvale, CA (US)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 202 days.

(21) Appl. No.: 17/127,962

(22) Filed: Dec. 18, 2020

(65) Prior Publication Data
US 2022/0197994 A1   Jun. 23, 2022

(51) Int. Cl.
| H04L 29/06 | (2006.01) |
| G06F 21/53 | (2013.01) |
| G06F 21/54 | (2013.01) |
| G06F 21/60 | (2013.01) |
| G06N 3/082 | (2023.01) |
| G06N 3/045 | (2023.01) |

(52) U.S. Cl.
CPC .............. *G06F 21/53* (2013.01); *G06F 21/54* (2013.01); *G06F 21/602* (2013.01); *G06N 3/045* (2023.01); *G06N 3/082* (2013.01)

(58) Field of Classification Search
CPC ........ G06F 21/53; G06F 21/54; G06F 21/602; G06N 3/0454; G06N 3/082
See application file for complete search history.

(56) References Cited

U.S. PATENT DOCUMENTS

| 2020/0302524 A1* | 9/2020 | Kamkar | G06N 20/20 |
| 2020/0348628 A1* | 11/2020 | Hoffmann | G06F 16/2358 |
| 2021/0192693 A1* | 6/2021 | Jepson | G06N 3/084 |
| 2021/0350203 A1* | 11/2021 | Das | G06N 3/08 |

(Continued)

OTHER PUBLICATIONS

Schlogl, Alexander et al., "eNNclave: Offline Inference with Model Confidentiality", Session 3: Machine Learning for Security and Privacy, AISec '20, Nov. 13, 2020, Virtual Event, USA, pp. 93-104 (Year: 2020).*

(Continued)

*Primary Examiner* — Evans Desrosiers
(74) *Attorney, Agent, or Firm* — LEFFLER INTELLECTUAL PROPERTY LAW, PLLC

(57) ABSTRACT

A neural network having one or more public parts and one or more confidential parts is trained to perform a primary task. A deployment instantiation of the neural network is trained based on optimal performance of the primary task, and based on sub-optimal performance of the primary task conditioned on the confidential parts of the deployment instantiation being inaccessible. An adversary instantiation of the neural network is trained based on optimal performance of the primary task conditioned on the public parts being identical for the deployment instantiation and for the adversary instantiation, and conditioned on the confidential parts of the deployment instantiation being inaccessible. The training of the deployment instantiation and the training of the adversary instantiation are based on a plurality of training data samples, and are performed iteratively by alternating between the training of the deployment instantiation and the training of the adversary instantiation.

26 Claims, 4 Drawing Sheets

(56) References Cited

U.S. PATENT DOCUMENTS

2021/0390188 A1* 12/2021 Mireshghallah ...... G06T 3/4046
2022/0075878 A1* 3/2022 Begg .................... G06F 21/602

OTHER PUBLICATIONS

Gunning, D., et al., "Crypten: A new research tool for secure machine learning with PyTorch", Facebook AI, ML Applications, Open Source, Oct. 10, 2019, 11 pages.

Uchida, Y., et al., "Embedding Watermarks into Deep Neural Networks", arXiv:1701.04082v2, Apr. 20, 2017, 10 pages.

Unknown, "Encrypted Deep Learning in TensorFlow", TFEncrypted, GitHub, date unknown (retrieved Jul. 16, 2020), 4 pages.

Abadi, M., et al., "Learning to Protect Communications with Adversarial Neural Cryptography", Google Brain, arXiv:1610.06918v1, Oct. 24, 2016, 15 pages.

Narra, K.G., et al., "Privacy-Preserving Inference in Machine Learning Services Using Trusted Execution Environments", arXiv:1912.03485v1, Dec. 7, 2019, 13 pages.

Dahl, M., et al., "Private Machine Learning in TensorFlow using Secure Computation", arXiv:1810.08130v2, Oct. 23, 2018, 6 pages.

Unknown, "A library for encrypted, privacy preserving machine learning", OpenMinded/PySyft, www.openminded.org/, date unknown (retrieved Jul. 16, 2020), 8 pages.

Tramer, F., et al., "Slalom: Fast, Verifiable and Private Execution of Neural Networks in Trusted Hardware", published as a conference paper at ICLR 2019, arXiv:1806.03287v2, Feb. 27, 2019, 19 pages.

PCT International Search Report, dated Apr. 4, 2022, in connection with International Application No. PCT/EP2021/084333, all pages.

PCT Written Opinion, dated Apr. 4, 2022, in connection with International Application No. PCT/EP2021/084333, all pages.

Schlogl, Alexander et al., "eNNclave: Offline Inference with Model Confidentiality", Session 3: Machine Learning for Security and Privacy, AISec '20, Nov. 13, 2020, Virtual Event, USA, pp. 93-104.

PCT International Preliminary Report on Patentability, dated Jun. 16, 2023, in connection with International Application No. PCT/EP2021/084333, all pages.

PCT Written Opinion, dated Feb. 21, 2023, in connection with related International Application No. PCT/EP2021/084333, 10 pages.

* cited by examiner

NEURAL NETWORK CONFIDENTIALITY

TECHNICAL FIELD

The present disclosure relates generally to the field of neural networks. More particularly, relates to confidentiality of a trained neural network.

BACKGROUND

Various scenarios exist where it may be desirable to keep a trained neural network confidential. For example, the owner of a neural network model may want to offer other parties authorized use of the neural network to perform a task for which it was trained, without such other parties being able to perform unauthorized use of the neural network.

One solution to this problem is to keep the neural network in a trusted environment using secure hardware. However, trusted environments may suffer from slow execution and/or bulky physical implementation.

Another attempt to solve the problem might involve applying any existing software obfuscation and/or cryptography to the neural network. However, the efficiency of such approaches are typically non-generic (i.e., dependent on the specifics of the neural network) and/or computationally complex.

Therefore, there is a need for alternative approaches for providing confidentiality of a trained neural network.

SUMMARY

It should be emphasized that the term "comprises comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a computer-implemented machine learning method for training of a neural network to perform a primary task.

The method comprises determining the neural network to comprise one or more public parts and one or more confidential parts, training a deployment instantiation of the neural network based on optimal performance of the primary task, and based on sub-optimal performance of the primary task conditioned on the confidential parts of the deployment instantiation being inaccessible, and training an adversary instantiation of the neural network based on optimal performance of the primary task conditioned on the public parts being identical for the deployment instantiation and for the adversary instantiation, and conditioned on the confidential parts of the deployment instantiation being inaccessible.

The training of the deployment instantiation and the training of the adversary instantiation are based on a plurality of training data samples, and are performed iteratively by alternating between the training of the deployment instantiation and the training of the adversary instantiation.

In some embodiments, performing the training of the deployment instantiation and the training of the adversary instantiation iteratively comprises (for each iteration) updating the public and confidential parts of the deployment instantiation of the neural network based on a considered data sample from the plurality of training data samples and based on a current state of the adversary instantiation, transferring the public parts of the deployment instantiation to the public parts of the adversary instantiation of the neural network, and updating parts of the adversary instantiation of the neural network that correspond to the confidential parts of the deployment instantiation based on the considered data sample.

In some embodiments, each of the training data samples comprises input data, first reference data, and second reference data, wherein the first reference data is for training of the deployment instantiation and the adversary instantiation and indicates optimal performance of the primary task for the input data, and the second reference data is for training of the deployment instantiation and indicates random performance of the primary task for the input data.

In some embodiments, the one or more confidential parts comprises two or more confidential parts.

In some embodiments, a first confidential part precedes at least one public part and a second confidential part is subsequent to the at least one public part.

In some embodiments, each of the training data samples comprises a confidential key value associated with the confidential parts. Then, training of the deployment instantiation may use the confidential key value for the confidential parts, and training of the adversary instantiation is conditioned on the confidential key value being inaccessible.

In some embodiments, the training comprises applying an optimization approach to an objective function conditioned on the plurality of training data samples.

In some embodiments, the objective function comprises at least first and second components, the first component indicating performance of the primary task as a function of settings for the public and confidential parts, and the second component indicating performance of the primary task as a function of settings for the public parts only.

In some embodiments, the objective function further comprises a third component indicating a bias for settings of the confidential parts towards settings that depend on the confidential key value.

A second aspect is a method for deployment of an instantiation of a neural network trained in accordance with the first aspect. The method comprises deploying the public parts of the instantiation in an un-trusted environment, and deploying the confidential parts of the instantiation in a trusted environment.

In some embodiments, the method further comprises deploying at least one instantiated key value associated with the confidential parts in the trusted environment.

A third aspect is use of an instantiation of a neural network to perform a primary task, wherein the instantiation of the neural network is trained in accordance with the first aspect and/or deployed in accordance with the second aspect.

A fourth aspect is a computer program product comprising a non-transitory computer readable medium, having thereon a computer program comprising program instructions. The computer program is loadable into a data processing unit and configured to cause execution of the method according to any of the first and second aspects when the computer program is run by the data processing unit.

A fifth aspect is an apparatus for training of a neural network to perform a primary task, wherein the neural network is determined to comprise one or more public parts and one or more confidential parts.

The apparatus comprises controlling circuitry configured to cause training of a deployment instantiation of the neural network based on optimal performance of the primary task, and based on sub-optimal performance of the primary task conditioned on the confidential parts of the deployment instantiation being inaccessible, and training of an adversary instantiation of the neural network based on optimal performance of the primary task conditioned on the public parts being identical for the deployment instantiation and for the adversary instantiation, and conditioned on the confidential parts of the deployment instantiation being inaccessible.

The controlling circuitry is configured to cause the training of the deployment instantiation and the training of the adversary instantiation to be performed iteratively based on a plurality of training data samples, by alternation between the training of the deployment instantiation and the training of the adversary instantiation.

In some embodiments, the controlling circuitry is further configured to cause determination of a split of the neural network into the one or more public parts and the one or more confidential parts.

A sixth aspect is an instantiation of a neural network trained in accordance with the first aspect.

A seventh aspect is a trusted environment comprising the confidential parts of an instantiation of a neural network trained in accordance with the first aspect.

An eighth aspect is a deployment of an instantiation of a neural network trained in accordance with the first aspect. The deployment comprises an un-trusted environment comprising the public parts of the instantiation, and the trusted environment of the seventh aspect.

A ninth aspect is a server comprising the apparatus of the fifth aspect and/or the trusted environment of the seventh aspect.

A tenth aspect is a server system comprising a plurality of servers, the system being configured to perform the training of the first aspect.

In some embodiments, any of the above aspects may additionally have features identical with or corresponding to any of the various features as explained above for any of the other aspects.

An advantage of some embodiments is that approaches are provided for keeping confidentiality of a trained neural network.

An advantage of some embodiments is that confidentiality is improved compared to at least some prior art approaches.

An advantage of some embodiments is that faster execution is enabled compared to at least some prior art approaches.

An advantage of some embodiments is that a physically smaller implementation is enabled compared to at least some prior art approaches.

An advantage of some embodiments is that requirements on the trusteed environment are relaxed (e.g., in terms of amount of storage) compared to at least some prior art approaches.

An advantage of some embodiments is that the approaches are generic (i.e., not dependent on the specifics of the neural network).

An advantage of some embodiments is that the computational complexity is reduced compared to at least some prior art approaches.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described for providing confidentiality of a trained neural network.

Some embodiments, are particularly beneficial in scenarios where a first party (e.g., an owner of a trained neural network) offers a second party authorized use of the neural network to perform a task for which it was trained. In such scenarios, some embodiments provide means to avoid that the second (or a third) party is able to perform unauthorized use of the neural network; i.e., keeping confidentiality of the trained neural network.

Alternatively or additionally, confidentiality may be achieved according to some embodiments while (at least partly) avoiding one or more drawbacks of other confidentiality solutions; e.g., slow execution, bulky physical implementation, high storage space needed in trusted environment, dependency on the specificities of the neural network, high complexity, etc.

Figure 1:
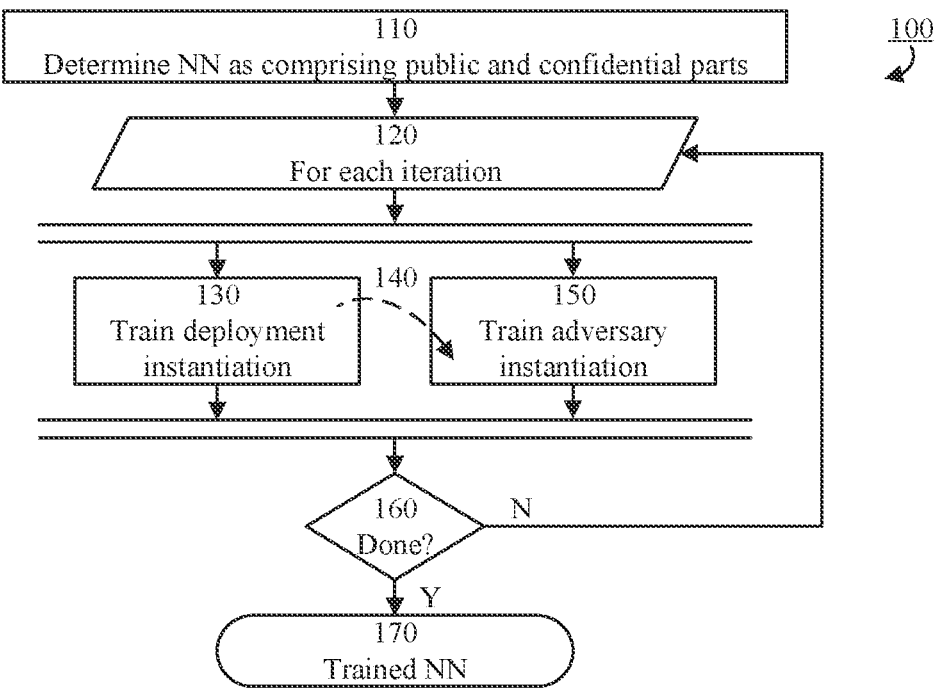
FIG. 1 is a flowchart illustrating example method steps according to some embodiments.

FIG. 1 illustrates an example method 100 according to some embodiments. The method 100 is a computer-implemented machine learning method for training of a neural network (NN) to perform a primary task. In the training for the primary task, measures are taken to also provide confidentiality of a trained neural network. Provision of confidentiality may be seen as a secondary task; for which the neural network is also trained.

Generally, the primary task may be any suitable task, e.g., any task conventionally performed by a neural network. Examples of suitable tasks include classification and/or labeling tasks in general, e.g., classification of an object in an image (recognizing human faces, for example), labeling of an object in an image (identifying floral species, for example), classification of a data record (recognizing speech, for example), labeling of a data record (identifying abnormalities in an electro cardio graphic data record, for example), classification of an image (recognizing photographic images, for example), labeling of an image (identifying outdoor images, for example), etc. Suitable tasks, as well as techniques for training neural networks to perform them, are well known to the skilled person and no further elaboration thereon will be given herein.

Also generally, the neural network may have any suitable structure. The neural network will be exemplified herein as a neural network that comprises layers of neurons, wherein performing the primary task comprises input data being propagated though the layers by application of weights associated with pairs of neurons of neighboring layers to produce an output (e.g., using activation functions). This exemplification is for illustrative purposes and should not be interpreted as limiting. Other suitable neural network structures are well known to the skilled person and no further elaboration thereon will be given herein.

Typically, the overall structure of the neural network is pre-determined for execution of the method 100. For example, it can be pre-defined that the neural network comprises layers of neurons, wherein the number of layers and/or the number of neurons per layer is also pre-defined.

The method 100 comprises determining the neural network to comprise one or more public parts and one or more (two or more) confidential parts, as illustrated by step 110. For example, step 110 may comprise splitting the neural network into the one or more public parts and the one or more confidential parts.

In some embodiments, the parts are configured to be sequentially applied when performing the primary task.

For example, when the neural network comprises layers of neurons, each of the public parts may comprise one or more layers and each of the confidential parts may comprise one or more layers (which are not layers of any public part).

According to one example, a first public part is configured to be applied to input data, a first confidential part is configured to be applied to the result of the application of the first public part, a second public part is configured to be applied to the result of the application of the first confidential part, and so on until an output is provided for the primary task.

According to one example, a first confidential part is configured to be applied to input data, a first public part is configured to be applied to the result of the application of the first confidential part, a second confidential part is configured to be applied to the result of the application of the first public part, and so on until an output is provided for the primary task. Put differently, a first confidential part precedes at least one public part and a second confidential part is subsequent to the at least one public part.

In a particular example, a layered neural network comprises at least one public part and two confidential parts termed encryption layer and decryption layer, respectively, wherein the public part is applicable between the encryption and decryption layers. This example will be further elaborated on in connection with FIGS. 5 and 7.

The training is conducted in an iterative fashion, alternating between training of a deployment instantiation of the neural network and training of an adversary instantiation of the neural network.

The deployment instantiation is an instantiation which—when training is completed—is configured to be used for performance of the primary task while keeping confidentiality of the trained neural network (i.e., performing also the secondary task). For example, authorized use of the deployment instantiation may be offered to another party as explained above. A first aim for the training of the deployment instantiation may be optimal performance of the primary task. A second aim for the training of the deployment instantiation may be sub-optimal performance of the primary task conditioned on the confidential parts of the deployment instantiation being inaccessible (which can be translated to optimal performance of the secondary task).

The adversary instantiation is an instantiation which—when training is completed—is configured to be discarded. An aim for the training of the adversary instantiation may be optimal performance of the primary task using the public parts of the deployment instantiation and without access to the confidential parts of the deployment instantiation.

The public parts are typically shared between the deployment instantiation and the adversary instantiation during training, while the confidential parts of the deployment instantiation and corresponding parts of the adversary instantiation are typically specific to each instantiation.

As already mentioned, the second aim for the training of the deployment instantiation—sub-optimal (e.g., worst case, or random) performance of the primary task conditioned on the confidential parts of the deployment instantiation being inaccessible—may be seen as an expression of a secondary task. Thus, optimal performance of the secondary task may be defined as sub-optimal (e.g., worst case, or random) performance of the primary task conditioned on the confidential parts of the deployment instantiation being inaccessible.

Generally, it should be understood that the notation "parts of the adversary instantiation that correspond to the confidential parts of the deployment instantiation" is not meant to indicate that such parts of the adversary instantiation are completely identical to the confidential parts of the deployment instantiation. Rather, this notation may be defined as such parts of the adversary instantiation being configured to aim for imitation of the confidential parts of the deployment instantiation. For example, such parts of the adversary instantiation may be identical in structure (e.g., number of layers and/or number of neurons per layer) to the confidential parts of the deployment instantiation; but without any knowledge of branch weights of confidential parts of the deployment instantiation.

When alternating between training of the deployment instantiation and training of the adversary instantiation, the public parts (e.g., corresponding weights) may be updated only in the training of the deployment instantiation, the confidential parts of the deployment instantiation (e.g., corresponding weights) may be updated only in the training of the deployment instantiation, and the parts of the adversary instantiation (e.g., corresponding weights) that correspond to the confidential parts of the deployment instantiation may be updated only in the training of the adversary instantiation.

Figure 6:
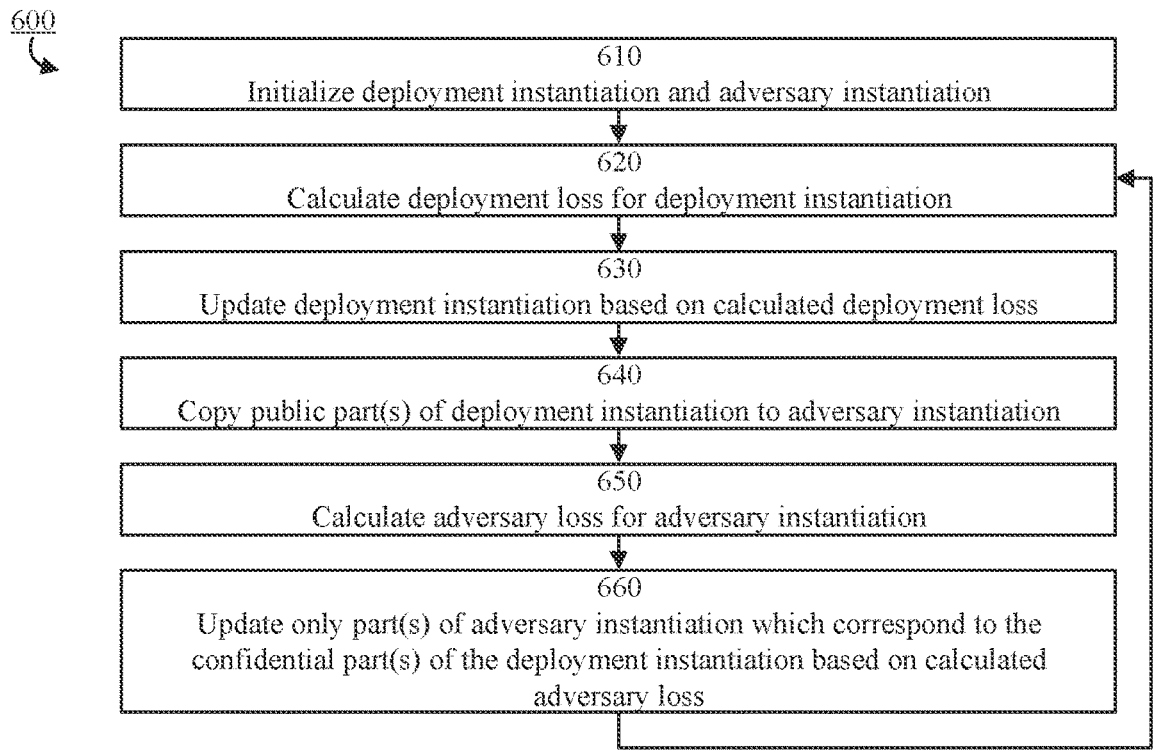
FIG. 6 is a flowchart illustrating example method steps according to some embodiments.

In an iteration, the public parts resulting from deployment instantiation training may be used by the subsequent adversary instantiation training (e.g., by copying the public part parameters from the deployment instantiation to the adversary instantiation as will be exemplified in connection to FIG. 6).

Alternatively or additionally, the deployment instantiation training in an iteration may comprise optimization for the secondary task based on the adversary instantiation of a previous iteration (e.g., the most recent iteration; the corresponding adversary instantiation setting also termed herein as the current state of the adversary instantiation).

In FIG. 1, the iterative procedure is exemplified as follows. For each iteration 120, the deployment instantiation is trained (as illustrated by step 130) and the adversary instantiation is trained (as illustrated by step 150).

As mentioned above, the training of the deployment instantiation in step 130 comprises training for optimal performance of the primary task, as well as training for optimal performance of the secondary task. Typically, step 130 uses the adversary instantiation result of step 150 from a previous iteration to train for optimal performance of the secondary task.

Typically, step 130 is performed before step 150 for each of the iterations, and information regarding the public parts resulting from step 130 is used by step 150, as illustrated by 140. It should be noted, however, that steps 130 and 150 may be performed in another order and/or in parallel for some (e.g., all) iterations.

In step 160, it is determined whether the training is complete. When so (Y-path out of step 160), the method 100 outputs the trained neural network, as illustrated by 170, When not (N-path out of step 160), the method 100 returns to step 120 to perform a next iteration. For example, the training may be considered complete when a maximum number of training data samples have been applied, and/or when testing of the neural network provides acceptable result (e.g., when the deployment instantiation is able to provide acceptable performance for the primary task and/or when the adversary instantiation is unable to provide acceptable performance for the primary task).

The training of the deployment instantiation is based on optimal performance of the primary task, and on sub-optimal performance of the primary task conditioned on the confidential parts of the deployment instantiation being inaccessible (e.g., sub-optimal performance of the primary task for an adversary—such as the adversary instantiation of the previous iteration—having access to only the public parts of the deployment instantiation). For example, the training of the deployment instantiation may have the purpose of achieving optimal performance of the primary task and/or sub-optimal (e.g., worst case, or random) performance of the primary task conditioned on the confidential parts of the deployment instantiation being inaccessible. Such purposes may, for example, be embodied through selection of training reference data (e.g., training labeling data) and/or selection of objective function (e.g., comprising at least two components) for training optimization.

The training of the adversary instantiation is based on optimal performance of the primary task conditioned on the public parts being identical for the deployment instantiation and for the adversary instantiation, and conditioned on the confidential parts of the deployment instantiation being inaccessible. For example, the training of the adversary instantiation may have the purpose of achieving optimal performance of the primary task when using the public parts of the deployment instantiation only; i.e., without access to the confidential parts of the deployment instantiation. Such purposes may, for example, be embodied through selection of training reference data (e.g., training labeling data) and/or selection of objective function for training optimization.

In some embodiments, each iteration comprises updating the public and confidential parts (e.g., associated weights) of the deployment instantiation in step 130 using information regarding a current adversary instantiation, transferring the public parts of the deployment instantiation to the public parts of the adversary instantiation (illustrated by 140), and updating parts (e.g., associated weights) of the adversary instantiation that correspond to the confidential parts of the deployment instantiation in step 150, Thereafter, a next iteration is performed, starting with step 130, and so on. It should be noted that the public parts are typically not updated in step 150; i.e., step 150 may comprise updating only parts of the adversary instantiation that correspond to the confidential parts of the deployment instantiation.

The training of the deployment instantiation (step 130) and the training of the adversary instantiation (step 150) are based on a plurality of training data samples.

In some embodiments, each training data sample is used for a single iteration. In some embodiments, each training data sample is used for a plurality of iterations (e.g., each instance of a training data sample may be used for a single iteration). In some embodiments, each iteration uses a plurality of training data samples.

Generally, a training data set may be defined as comprising a plurality of training data samples, wherein each training data sample may be used once or several times during training; each use corresponding to an instance of the training data sample.

Each of the training data samples typically comprises input data, first reference data, and second reference data.

The first reference data (e.g., training labeling data) is for training of the deployment instantiation and the adversary instantiation and indicates optimal performance of the primary task for the input data. Thus, the first reference data is related to the primary task (e.g., via a first component of an objective function; as will be exemplified later herein). For example, the first reference data may be a vector of elements, wherein each element represents a classification/labeling according to the primary task. Optimal performance of the primary task for the input data may be indicated by the first reference data by such a vector having element value equal to a first value (e.g., one) for element(s) corresponding to the optimal classification/labeling of the input data and having element value equal to a second value (e.g., zero) for element(s) not corresponding to the optimal classification/labeling of the input data. This is commonly referred to as a one-hot vector representing the optimal classification label for the input data.

The second reference data (e.g., training labeling data) is for training of the deployment instantiation and indicates sub-optimal (e.g., worst case, or random) performance of the primary task. Thus, the second reference data is related to the secondary task (e.g., via a second, and possibly third, component of an objective function; as will be exemplified later herein). For example, the second reference data may be a vector of elements, wherein each element represents a classification/labeling according to the primary task. Random performance of the primary task for the input data may be indicated by the second reference data by such a vector having element value equal to some value (e.g., one divided by the number of elements) for all element(s). This may be referred to as a smoothed vector for the input data.

The training of the deployment instantiation (step 130) and the training of the adversary instantiation (step 150) may comprise applying an optimization approach to an objective function conditioned on the plurality of training data samples. Suitable optimization approaches are well known, as well as how to use objective functions in such approaches (e.g., application of loss and/or cost to determined weight values), and this will not be elaborated on or exemplified further herein.

For example, training may comprise running input data through the neural network to produce an output, comparing the output to corresponding (first and/or second) reference data, and adjusting the neural network setting (e.g., weight values) based on the comparison. One example comprises using the comparison to generate a gradient for an objective function, and using the gradient to update the neural network setting.

In some embodiments, the objective function comprises at least first and second components. A component of the objective function may, generally, be any suitable component; e.g., a term (for addition/subtraction), a factor (for multiplication), a nominator or denominator (for division), etc.

The first component indicates performance of the primary task as a function of settings for the public and confidential parts. Thus, the first component may be used in the training of the deployment instantiation (for the purpose of achieving optimal performance of the primary task), as well as in the training of the adversary instantiation (for the purpose of achieving optimal performance of the primary task).

The second component indicates performance of the primary task as a function of settings for the public parts only. For example, the second component may indicate performance of the primary task by the current state of the adversary instantiation. Thus, the second component may be used in the training of the deployment instantiation (for the purpose of sub-optimal—e.g., worst case—performance of the primary task conditioned on the confidential parts of the deployment instantiation being inaccessible), while not being used in the training of the adversary instantiation.

The training of the adversary instantiation—using the first component—towards a solution embodying a strong adversary (i.e., an adversary that performs the primary task well) enables that the training of the deployment instantiation—using the first and second components—is guided towards a solution that that performs the primary task well while providing proper (e.g., improved) protection against such strong adversaries. Put differently, using the trained adversary instantiation in deployment instantiation training for the secondary task results in confidential part settings that—when the training is complete—make the public part(s) unsuitable (e.g., less usable) for an adversary trying to solve the primary task. This can be achieved by updating the public part(s) of the deployment instantiation to degrade performance of the primary task for the adversary instantiation.

In some embodiments, each of the training data samples comprises a confidential key value associated with the confidential parts; thereby introducing more uncertainty for an adversary. The key value may differ between some (e.g., all) instantiations of the training data samples and/or may be the same for some (e.g., all) instances of a training data sample and/or may differ between some (e.g., all) of the training data samples and/or may be the same for some (e.g., all) of the training data samples. The key value is particularly useful when it is associated with at least two confidential parts, which have a public part there between.

An advantage of using a key value is that different deployment instantiations may be easily provided (e.g., for different users), by use of different key values.

When the key value approach is applied, training of the deployment instantiation uses the confidential key value for the confidential parts, while training of the adversary instantiation is conditioned on the confidential key value being inaccessible. Thus, training of the adversary instantiation may apply some random key value, or may not be aware that there is any key value at all.

When the key value approach is applied, the objective function may further comprise a third component.

The third component indicates a bias for settings of (at least) the confidential parts towards settings that depend on the confidential key value. Thus, the third component may be used in the training of the deployment instantiation (for the purpose of sub-optimal—e.g., worst case—performance of the primary task conditioned on the confidential parts of the deployment instantiation being inaccessible; e.g., using the current state of the adversary instantiation as described above), while not being used in the training of the adversary instantiation. Application of the third component may be seen as a way to ensure usage of the key value(s) for determining (e.g., weight values of) the confidential parts of the deployment instantiation.

In some embodiments, the third component may be a loss function. For example, such a loss function may be based on a norm difference in a comparison between outputs from a confidential layer with a valid key value and outputs from the same layer when the key value is invalid (e.g., chosen at random or all-zero).

Generally, the training may be conducted by applying gradient descent on the objective function (e.g., a loss function). Alternatively or additionally, the training may comprise searching for the optimal set of network parameter settings $\Theta$ that—for the training data set X, satisfies $$\theta = \underset{w}{\operatorname{argmin}} L(X, w),$$

wherein L(X,w) denotes the objective function and w denotes the set of parameters (weights) of the neural network.

Generally, the objective function may comprise a first component $L_1(X, w)$ that is indicative of performance of the primary task. The objective function $L(X, w)=L_1(X, w)$ may be used for training of the adversary instantiation.

To enable the training to also incorporate the goal of sub-optimal performance of the primary task conditioned on the confidential parts of the deployment instantiation being inaccessible (e.g., using the current state of the adversary instantiation as described above), the objective function may comprise a second component $A(X, w_p)$. Thus, the second component may correspond to the goal of making it as hard as possible for an adversary to use the information in the public parts to achieve good performance for the primary task without knowledge of the confidential parts. Thus, the objective function $L(X, w)=L_1(X, w)+A(X, w_p)$ may be used for training of the deployment instantiation, where $w_p$ denotes the set of parameters (weights) of the public parts of the neural network (i.e., $w_p$ is a subset of w). Hence, the second component may be configured to degrade performance of the primary task for the adversary instantiation by updating of the public parts of the deployment instantiation.

If secret key values are used, the objective function may comprise a third component $A_K(X, w)$ that encourage (bias) the training towards using the secret key value. Thus, the objective function $L(X, w)=L_1(X, w)+A(X,w_P)+A_K(X, w)$ may be used for training of the deployment instantiation in such situations.

For classification problems, one suitable loss function expresses cross entropy on softmax outputs of the model. Thus, the first component $L_1(X, w)$ may express categorical cross entropy with optimal label selection—aiming for optimal labelling. The second component $A(X, w_p)$ may express categorical cross entropy with maximal label smoothing (smoothed vector)—aiming for the public parts to yield random labelling when not associated with the confidential parts. The third component $A_K(X, w)$ may express categorical cross entropy with maximal label smoothing (smoothed vector)—aiming for random labelling when no key value is used (e.g., key values not matching for different confidential parts); or when the key value is not known (e.g., erroneous key value for the confidential parts). Alternatively or additionally, the third component may be a loss function based on a norm difference in a comparison between outputs from a confidential layer with a valid key value and outputs from the same layer when the key value is invalid (e.g., chosen at random or all-zero).

Figure 2:
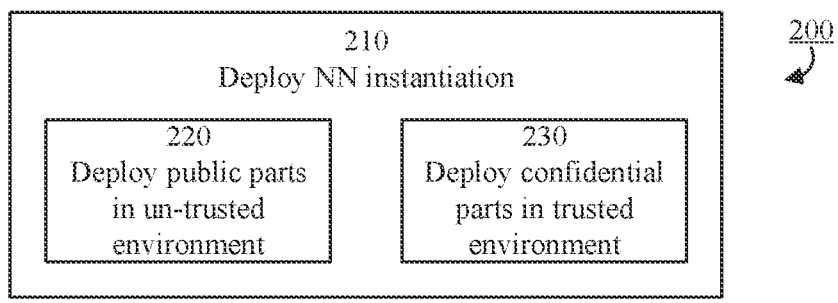
FIG. 2 is a flowchart illustrating example method steps according to some embodiments.

FIG. 2 illustrates an example method 200 according to some embodiments. The method 200 is for deployment of an instantiation of a neural network (i.e., a neural network instantiation), as illustrated by 210. The neural network instantiation is trained in accordance with any of approaches disclosed herein. For example, the neural network instantiation may be the deployment instantiation trained in accordance with the method 100 of FIG. 1.

The deployment of the neural network instantiation comprises deploying the public parts of the instantiation in an un-trusted environment (as illustrated by sub-step 220) and deploying the confidential parts of the instantiation in a trusted environment (as illustrated by sub-step 230). In some embodiments, deployment of the neural network instantiation may comprise deploying an instantiated key value associated with the confidential parts in the trusted environment. Alternatively or additionally, deployment of the neural network instantiation may comprise assigning a plurality of instantiated key values associated with the confidential parts in the trusted environment. For example, the key value may be changed between different calls/uses of the neural network instantiation.

Generally, the un-trusted environment may be implemented by any suitable hardware and/or software. For example, the un-trusted environment may be hardware and/or software accessible by a user of the neural network instantiation.

Also generally, the trusted environment may be implemented by any suitable hardware and/or software. For example, the trusted environment may be hardware and/or software inaccessible by a user of the neural network instantiation (e.g., a trusted execution environment—TEE—in an arrangement managed by the user, or an environment residing in an arrangement managed by the owner of the neural network instantiation).

Figure 3:
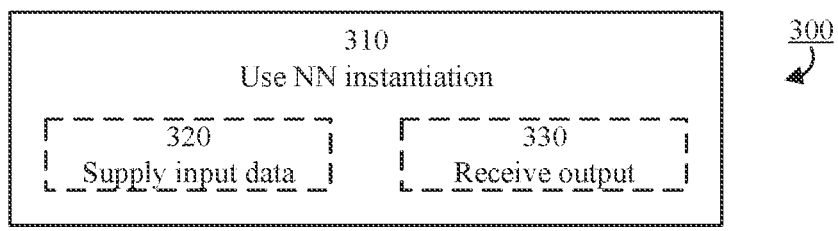
FIG. 3 is a flowchart illustrating example method steps according to some embodiments.

FIG. 3 illustrates an example method 300 according to some embodiments. The method 300 is for use of an instantiation of a neural network (i.e., a neural network instantiation) to perform a primary task, as illustrated by 310. The neural network instantiation is trained and/or deployed in accordance with any of approaches disclosed herein. For example, the neural network instantiation may be the deployment instantiation trained in accordance with the method 100 of FIG. 1 and/or the neural network instantiation deployed in accordance with the method 200 of FIG. 2.

Typically, using the neural network instantiation to perform the primary task comprises supplying input data (as illustrated by optional sub-step 320) and receiving an output (as illustrated by optional sub-step 330). The input data may be of the same type as the input data of the plurality of training data samples.

For example, if the primary task is to classify images into two categories (e.g., showing one or more human faces, and not showing any human face, respectively), the input data of sub-step 320 may be an image and the output of sub-step 330 may be a vector of two elements, wherein each element represents a classification in a respective one of the two categories. The element values may be hard values (selecting one of the categories; e.g., selection indicated by value one and non-selection indicated by value zero) or soft values (providing probability, or likelihood, for the categories; e.g., indicated by values from zero to one).

Figure 4:
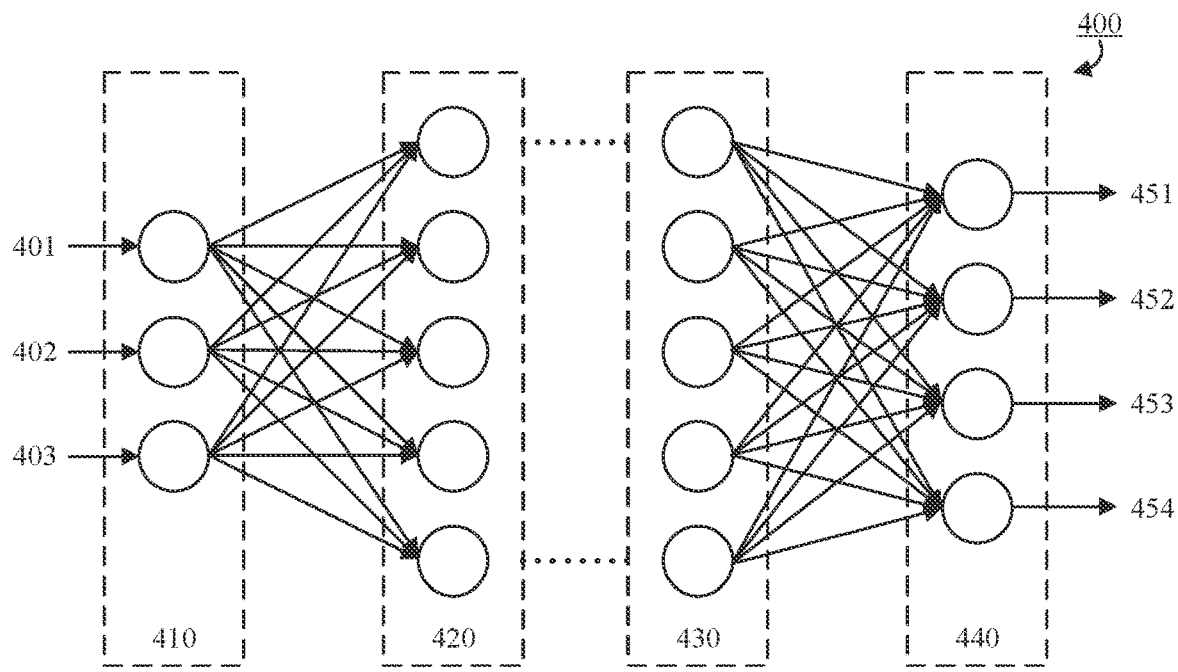
FIG. 4 is a schematic diagram illustrating an example neural network according to some embodiments.

FIG. 4 schematically illustrates an example neural network 400 according to some embodiments. The neural network 400 is configured to receive input data 401, 402, 403 and to provide an output 451, 452, 453, 454. Furthermore, the neural network has a plurality of layers 410, 420, 430, 440. Each layer comprises a number of neurons (shown as circles in FIG. 4). A transition branch between each pair of neurons in neighboring layers represent weights to be determined in training of the neural network.

The neural network 400 may be seen as a schematic exemplification of a neural network structure for any of the neural network instantiations described herein. For example, the neural network may represent the structure of one or more of: the deployment instantiation trained in accordance with the method 100 of FIG. 1, the adversary instantiation trained in accordance with the method 100 of FIG. 1, the neural network instantiation deployed in accordance with the method 200 of FIG. 2, the neural network instantiation used in accordance with the method 300 of FIG. 3, the deployment instantiation in the training setup 500 of FIG. 5, the adversary instantiation in the training setup 500 of FIG. 5, the deployment instantiation trained in accordance with the method 600 of FIG. 6, the adversary instantiation trained in accordance with the method 600 of FIG. 6, and the neural network instantiation of the deployment setup 700 of FIG. 7.

As explained before, each of the one or more confidential parts may comprise one or more of the layers 410, 420, 430, 440, and each of the one or more public parts may comprise one or more of the layers 410, 420, 430, 440. Typically, each layer is comprised in exactly one (confidential or public) part.

Generally, the definition that a layer is comprised in a part may be interpreted as the neurons of the layer belonging to the part. Alternatively or additionally, the definition that a layer is comprised in a part may be interpreted as incoming and/or outgoing weights associated with the neurons of the layer belonging to the part. For example, if a confidential part is the layer 420, then the weights represented by the transition branches between neurons in layer 410 and 420 may be confidential.

Figure 5:
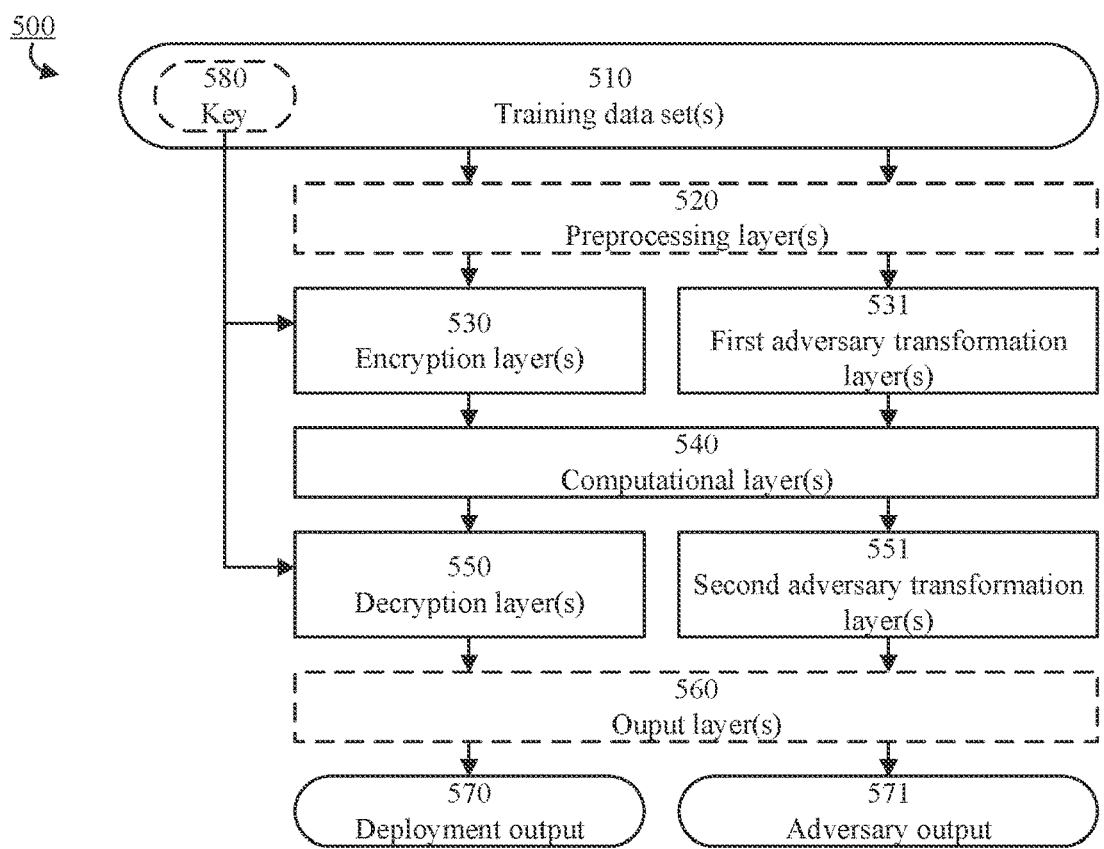
FIG. 5 is a schematic block diagram illustrating an example training setup according to some embodiments.

FIG. 5 schematically illustrates an example training setup 500 according to some embodiments. The training setup 500 may be seen as a schematic exemplification for training of any of the neural networks described herein. For example, the training setup 500 may be used for training in accordance with the method 100 of FIG. 1.

The training is based on training data samples, as illustrated by 510. In some embodiments, each training data sample comprises a key value, as represented by 580.

The training setup comprises a deployment instantiation and an adversary instantiation (compare with the description in connection to FIG. 1).

The deployment instantiation comprises a first confidential part (e.g., one or more encryption layers) 530, a second confidential part (e.g., one or more decryption layers) 550, and a public part (e.g., one or more computational layers) 540 there between. Optionally, the deployment instantiation may further comprise a further public part precedent to the first confidential part (e.g., one or more preprocessing layers) 520 and/or a further public part subsequent to the second confidential part (e.g., one or more output layers) 560.

In each iteration, training of the deployment instantiation (compare with 130 of FIG. 1) is based on a training data sample which associates input data with first and second reference data (e.g., a hot vector and a smoothed vector). The training uses an objective function to optimize performance of the primary task for the deployment output 570, and to provide sub-optimal performance of the primary task conditioned on the confidential parts of the deployment instantiation being inaccessible (e.g., un-known) by using the current state of the adversary instantiation. When a key value is included in the training data sample, the objective function may give bias to weight settings that depend on the key value (e.g., bias in proportion to dependency, or single-valued bias for dependencies above some threshold value). The latter may, typically, be achieved by letting the third component be part of the objective function to cause that the solutions found by gradient descent include solutions that depend on the key value. In practice this can, for example, be done by designing a loss-component that gives more loss if two outputs with differing keys in encryption gives the same output.

The objective function may have a first component relating to optimization of performance of the primary task, a second component relating to sub-optimal performance of the primary task conditioned on the confidential parts of the deployment instantiation being inaccessible, and, (optionally) a third component relating to biasing towards dependency on the key value. In each iteration, training of the deployment instantiation results in an update of the public part(s) 520, 540, 560, as well as updating of the confidential parts 530, 550.

The adversary instantiation comprises a first adversary transformation part (e.g., one or more first adversary layers) 531, a second adversary transformation part (e.g., one or more second adversary transformation layers) 551, and a public part (e.g., one or more computational layers) 540 there between. Optionally, the deployment instantiation may further comprise a further public part precedent to the first adversary transformation part (e.g., one or more preprocessing layers) 520 and/or a further public part subsequent to the second adversary transformation part (e.g., one or more output layers) 560. The first adversary transformation part 531 corresponds in structure to the first confidential part 530 of the deployment instantiation, and the second adversary transformation part 551 corresponds in structure to the second confidential part 550 of the deployment instantiation. The public part(s) 520, 540, 560 are shared between the deployment instantiation and the adversary instantiation (compare with the transfer represented by 140 in FIG. 1).

In each iteration, training of the adversary instantiation (compare with 150 of FIG. 1) is based on a training data sample which associates input data (the same input data as for the training of the deployment instantiation) with first reference data (the same first reference data as for the training of the deployment instantiation; e.g., a hot vector), The training uses an objective function to optimize performance of the primary task for the adversary output 571. The objective function used for training the adversary instantiation may have a same first component as the objective function used for training the deployment instantiation, but without any second (and third) component. In each iteration, training of the adversary instantiation results in an update of only the adversary transformation parts 531, 551.

FIG. 6 illustrates an example method 600 according to some embodiments. The method 600 may be seen as an exemplification of the method 100 of FIG. 1. Alternatively or additionally, the method 600 may be suitable to use for training in connection with the training setup 500 of FIG. 5.

In step 610, the deployment instantiation and the adversary instantiation are initialized. This may comprise using any suitable initialization. For example, the weights of the instantiations may be set randomly, or all weights of the instantiations may be set to predetermined values (e.g., the same value for all weights).

In step 620, the deployment loss is calculated for the deployment instantiation. The calculation may be based on an objective function in relation to a training data sample which associates input data with first and second reference data.

In step 630, the deployment instantiation is updated (e.g., new weight values are set for the public and confidential parts of the deployment instantiation, compare with 520, 530, 540, 550, 560 of FIG. 5) based on the calculated deployment loss of step 630.

Steps 620 and 630 may be seen as an exemplification of step 130 of FIG. 1.

In step 640, the public part(s) of the deployment instantiation is copied to the adversary instantiation (compare with 140 of FIG. 1).

In step 650, the adversary loss is calculated for the adversary instantiation. The calculation may be based on an objective function in relation to a training data sample which associates input data with first reference data.

In step 660, the adversary instantiation is updated (e.g., new weight values are set for the adversary transformation parts only of the adversary instantiation, compare with 531, 551 of FIG. 5) based on the calculated adversary loss of step 650.

Steps 640 and 650 may be seen as an exemplification of step 150 of FIG. 1.

Steps 620, 630, 640, 650, 660 are iterated until the training is determined as completed (compare with 120, 160 of FIG. 1).

Figure 7:
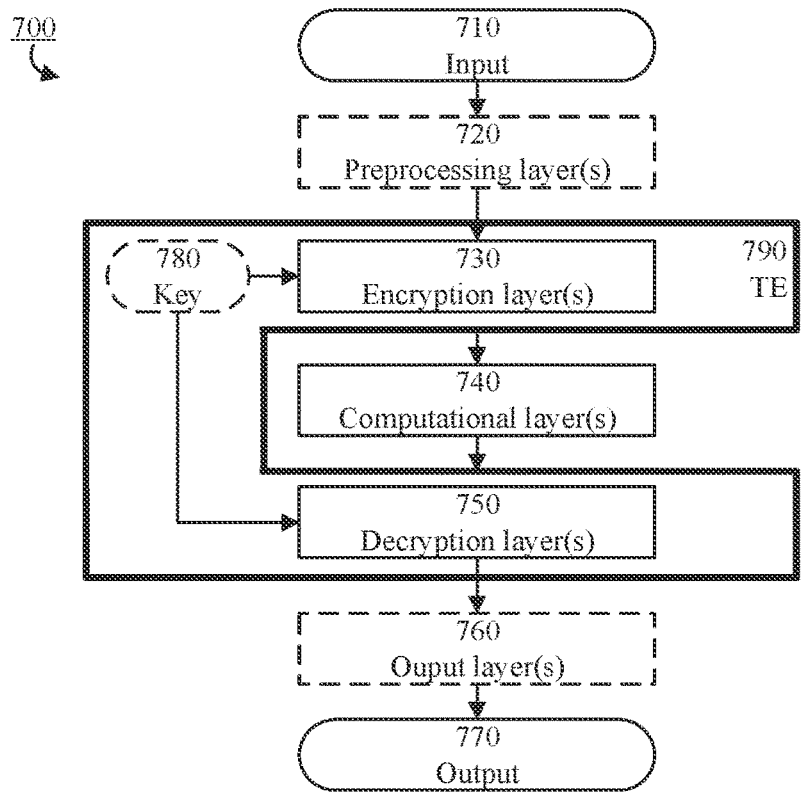
FIG. 7 is a schematic block diagram illustrating an example deployment setup according to some embodiments.

FIG. 7 schematically illustrates an example deployment setup 700 according to some embodiments.

The deployment setup 700 may be seen as a schematic exemplification of a deployment setup suitable for any of the neural network instantiations described herein. For example, the deployment setup 700 may be suitable for one or more of: the deployment instantiation trained in accordance with the method 100 of FIG. 1, the neural network instantiation deployed in accordance with the method 200 of FIG. 2, and the neural network instantiation used in accordance with the method 300 of FIG. 3. The deployment setup 700 may be particularly suitable for the deployment instantiation trained using the training setup 500 of FIG. 5 and/or trained in accordance with the method 600 of FIG. 6.

The deployment setup 700 comprises a first confidential part (e.g., one or more encryption layers) 730, a second confidential part (e.g., one or more decryption layers) 750, and a public part (e.g., one or more computational layers) 740 there between. Optionally, the deployment instantiation may further comprise a further public part precedent to the first confidential part (e.g., one or more preprocessing layers) 720 and/or a further public part subsequent to the second confidential part (e.g., one or more output layers) 760.

The confidential parts 730, 750 are deployed in a trusted environment (TE; e.g., protected memory or similar) 790; possibly in association with a key value 780.

When the deployment setup 700 is used, an input is supplied (as illustrated 710; compare with 320 of FIG. 3) and an output is received (as illustrated by 770; compare with 330 of FIG. 3). The output 770 corresponds to a result of the input 710 being processed by the deployment setup 700.

Figure 8:
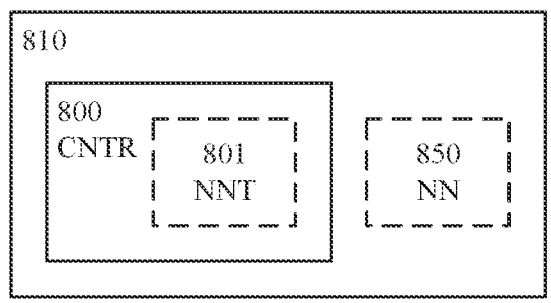
FIG. 8 is a schematic block diagram illustrating an example apparatus according to some embodiments.

FIG. 8 schematically illustrates an example apparatus 810 according to some embodiments. The apparatus 810 is for training of a neural network to perform a primary task, wherein the neural network is determined to comprise one or more public parts and one or more confidential parts. The neural network (NN; e.g., neural network circuitry or a neural network module; compare with 400 of FIG. 4) 850 may be comprised in the apparatus 810 as illustrated in FIG. 8, may be external to the apparatus 810, or may be partly comprised in the apparatus and partly external to the apparatus 810.

The apparatus 810 may, for example, be a device (e.g., a server) managed by the owner and/or provider of the deployment instantiation, or a collection of devices (e.g., a system of servers) managed by the owner and/or provider of the deployment instantiation.

The apparatus 810 may, for example, be configured to perform (or cause performance of) any of the training methods described herein (e.g., the method 100 of FIG. 1 and/or the method 600 of FIG. 6).

The apparatus 810 comprises a controller (CNTR; e.g., controlling circuitry or a control module) 800.

The controller 800 is configured to cause training of a deployment instantiation of the neural network based on optimal performance of the primary task, and based on sub-optimal performance of the primary task conditioned on the confidential parts of the deployment instantiation being inaccessible (compare with 130 of FIGS. 1 and 620, 630 of FIG. 6). The controller is also configured to cause training of an adversary instantiation of the neural network based on optimal performance of the primary task conditioned on the public parts being identical for the deployment instantiation and for the adversary instantiation, and conditioned on the confidential parts of the deployment instantiation being inaccessible (compare with 150 of FIGS. 1 and 650, 660 of FIG. 6). As mentioned before, the training is performed iteratively based on a plurality of training data samples, by alternation between the training of the deployment instantiation and the training of the adversary instantiation. The training of the deployment instantiation of the neural network based on sub-optimal performance of the primary task conditioned on the confidential parts of the deployment instantiation being inaccessible may be achieved by using the adversary instantiation of a previous iteration as elaborated on above.

To this end, the controller 800 may comprise, or be otherwise associated with (e.g., connected, or connectable, to) a neural network trainer (NNT; e.g., neural network training circuitry or a neural network training module) 801. The neural network trainer may be configured to perform the training of the deployment instantiation and the adversary instantiation; e.g., as described herein.

For example, the controller 800 and/or the neural network trainer 801 may be configured to—in an iterative manner, alternating between the deployment instantiation and the adversary instantiation—apply a plurality of training data samples to the neural network 850, calculate corresponding losses using respective objective functions, and update the instantiations accordingly.

In some embodiments, the controller 800 may be further configured to initially cause determination of a split of the neural network 850 into the one or more public parts and the one or more confidential parts.

A trained deployment instantiation of a neural network may be deployed and/or used for performance of the primary task as mentioned before.

Figure 9:
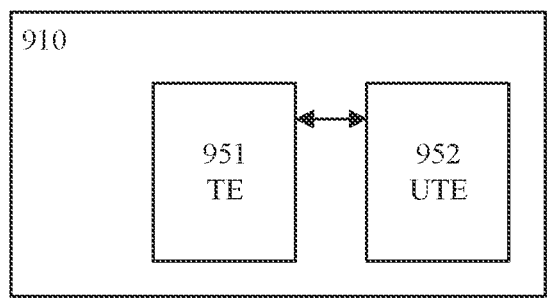
FIG. 9 is a schematic block diagram illustrating an example deployment according to some embodiments.
Figure 10:
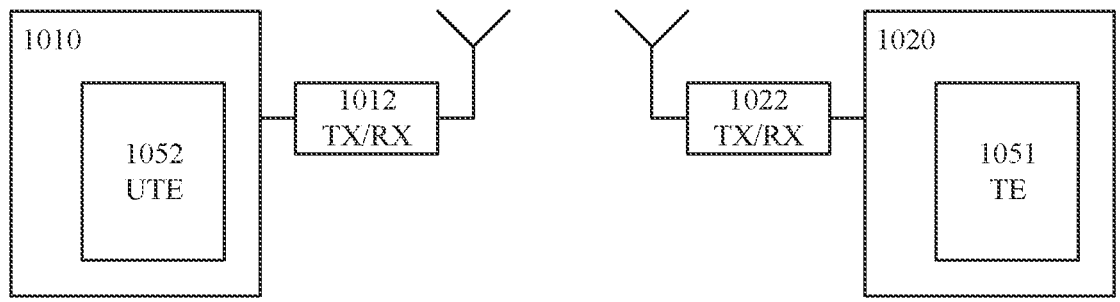
FIG. 10 is a schematic block diagram illustrating an example deployment according to some embodiments.

FIGS. 9 and 10 schematically illustrates two example deployments according to some embodiments. The deployments are of an instantiation of a neural network trained in accordance with any of the training approaches described herein.

The deployment of FIG. 9 is within a same arrangement 910. The arrangement 910 may, for example, be a device (e.g., a server) managed by the user of the deployment instantiation, or a collection of devices (e.g., a system of servers) managed by the user of the deployment instantiation.

The deployment comprises an un-trusted environment (UTE) 952 comprising the public parts of the deployment instantiation of the neural network, and a trusted environment (TE) 951 comprising the confidential parts of the deployment instantiation of the neural network.

As mentioned before, the un-trusted environment may be implemented by any suitable hardware and/or software and the trusted environment may be hardware and/or software inaccessible by a user of the neural network instantiation (e.g., a trusted execution environment—TEE—in an arrangement managed by the user).

In one example, deploying the confidential parts of the deployment instantiation in the arrangement 910 comprises providing—for installation in the arrangement 910—hardware implementing the trusted environment with the confidential parts of the deployment instantiation already included.

In one example, deploying the confidential parts of the deployment instantiation in the arrangement 910 comprises providing software—for installation in the arrangement 910—carrying the confidential parts of the deployment instantiation in a protected manner (e.g., encrypted, or otherwise secured), wherein the installation comprises unpacking (e.g., decrypting) the confidential parts of the deployment instantiation within the trusted environment of the arrangement 910.

During use of the deployment instantiation of FIG. 9, any exchange of information between the public and confidential parts may take place using an interface between the UTE 952 and the TE 951.

The deployment of FIG. 10 is distributed over two different arrangements 1010, 1020. The arrangement 1010 may, for example, be a device (e.g., a server) managed by the user of the deployment instantiation, or a collection of devices (e.g., a system of servers) managed by the user of the deployment instantiation. The arrangement 1020 may, for example, be a device (e.g., a server) managed by the owner/provider of the deployment instantiation, or a collection of devices (e.g., a system of servers) managed by the owner provider of the deployment instantiation.

The deployment comprises an un-trusted environment (UTE) 1052 comprising the public parts of the deployment instantiation of the neural network, and a trusted environment (TE) 1051 comprising the confidential parts of the deployment instantiation of the neural network. The UTE 1052 is deployed within the arrangement 1010 and the TE 1052 is deployed within the arrangement 1020.

As mentioned before, the un-trusted environment may be implemented by any suitable hardware and/or software and the trusted environment may be hardware and/or software inaccessible by a user of the neural network instantiation (e.g., an environment residing in an arrangement managed by the owner of the neural network instantiation).

During use of the deployment instantiation of FIG. 10, any exchange of information between the public and confidential parts may take place using signaling between the UTE 1052 and the TE 1051; implemented by transceivers (TX/RX) 1012, 1022 of the arrangements 1010, 1020.

Some relevant scenarios for application of some embodiments relate to business opportunities arising with increasing demand for automation in combination with improved performance of machine learning (ML). Services may be offered via machine learning models neural network instantiation) trained on data that is proprietary to owners/providers of neural network models.

This can, for example, be in the form of Machine Learning as a Service (MLaaS) where the service is offered through an application programming interface (API) and the model is hosted in the owner/provider premises.

However, due to user privacy concerns and/or connectivity issues, it may be desirable to run the ML model directly on user hardware and/or on hardware controlled by a third party (engaged by the user to administrate and maintain the infrastructure). Such scenarios may raise confidentiality concerns for the owner/provide (e.g., seeking protection against illicit use of the ML model).

Thus, in some scenarios it may be desirable to be able to deploy products comprising ML models carrying proprietary information on infrastructure which is not controlled and/or trusted by the model owner/provider, without exposing the proprietary information.

One approach to solve this problem is to employ hardware (HW) mechanisms for enhanced security. For example, protection may be achieved using HW Trusted Execution Environment (TEE) technology (e.g., secure enclaves, such as Intel software guard extension, SGX). Another approach to solve this problem is to employ software mechanisms.

The hardware approach may be expected to give stronger protection under some assumptions. However, mechanisms required for the hardware approach may be available only in some devices (e.g., recent generations of central processing units, CPUs). Moreover, running an entire ML model within a TEE may not always be suitable. For example, since accelerators (e.g., graphics processing units, GPUs) may not support trusted executions, applications using the ML model cannot take advantage of such accelerators if run entirely in TEE. Alternatively or additionally, the memory of a TEE may be limited, and exceeding that limited memory may require using memory external to the TEE, leading to frequent swapping of data in and out of the TEE which may entail significant performance slowdown. Furthermore, running ML models within secure HW environments may require the ML model to be adjusted for work within such environments, which may be undesirable.

Thus, there is a need for solutions that do not rely on executing the entire ML model in a secure HW environment but still protect the proprietary information.

In relation to the software approach, some alternatives for protecting ML models include ML model watermarking, various forms of encryption of ML models, and software obfuscation tools. Examining application of existing program obfuscation tools to the problem at hand may reveal that it depends on the specifics of the ML model implementation and the specific obfuscation technique whether any protection at all can be achieved, and/or the extent of the achievable protection. For example, in some cases the ML algorithm implementation leverages some open source package(s) and the trained ML model is represented by parameters in a data structure. Code obfuscation techniques would typically focus on hiding the code structure, which would be irrelevant since it is open source and thereby inherently not secret. Therefore, hiding the code structure does not result in any useful protection in such an example. Examining application of other software approaches (or combinations of software approaches) to the problem at hand may reveal that strong protection (with low overhead complexity) requires a solution tailored to the ML model; i.e., non-generic solution.

Thus, there is a need for solutions that protect the proprietary information better than existing software approaches.

Narra et al., "Privacy-Preserving Inference in Machine Learning Services Using Trusted Execution Environments", https://arxiv.org/arXiv:1912.03485, Dec. 7, 2019 investigates the problem of preserving the privacy of user input sent to a cloud-based machine learning inference service; thus focusing on protection of input data, rather than protection of the model.

Contrarily, some embodiments presented herein aim to find a way to protect an ML model. According to some embodiments, an approach to training is presented where an objective is to find a model where the first one or more layers provide a transformation that makes it difficult to use the remaining layers (without knowledge of the transformation) and where the transformation is difficult to reconstruct (compare, e.g., with the encryption layer(s) 530 of FIG. 5).

Thus, some embodiments provide solutions that protect a machine learning model from being stolen/accessed/used by an adversary. To this end, the model may be created as two or more consecutive components (parts) executed in sequence. Some of the components (confidential parts) may be protected from access by the user of the model (or another adversary) by running them on trusted HW (e.g. in TEE on user controlled HW or in a server hosted by the model owner), whereas the components (public parts) containing the bulk of computations can be run on untrusted user hardware. To be able to use the model, all components (public and confidential parts) need to interact according to some embodiments.

In order to achieve an optimal (or at least adequate) setting for the partition of a machine learning model, a training algorithm is provided according to some embodiments, wherein the training algorithm has as objective to make the public parts useless without knowledge of the confidential parts.

For example, a training goal may be to find a confidential part of the model that transforms input data in a way that makes it hard to reconstruct the transformation based on the input/output samples of the transformation, and a public part of the model that solves the original problem with the output samples of the transformation as input.

Alternatively or additionally, the public and confidential parts may be trained to minimize the accuracy of an adversary that knows the public part and tries to learn the combined model based on input/output samples of the model.

Thus, as has already been exemplified, the training of the model may be performed in an adversarial fashion; with the dual objective of fooling an adversary while providing proper performance of the primary task.

Some embodiments use secret key values (associated with the confidential parts) during training. Thereby, it is possible for the training to discover transformations which are easily tailored to a specific key value. The secret key values may—preferably but not necessarily—be changed during training (e.g., different key values for different training input samples and/or different key values for different instances of training input samples) to avoid transformations tied to a specific key value, and rather enforce learning of key-based transformations.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a server, or a system comprising a plurality of servers.

Embodiments may appear within an electronic apparatus (such as a server) comprising arrangements, circuitry, and/or logic according to any of the embodiments described herein. Alternatively or additionally, an electronic apparatus (such as a server) may be configured to perform methods according to any of the embodiments described herein.

Figure 11:
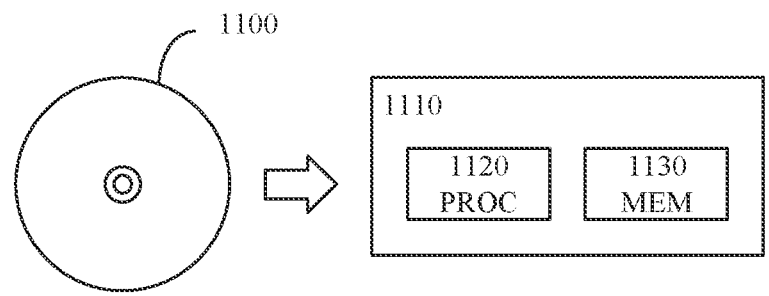
FIG. 11 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 11 illustrates an example computer readable medium in the form of a compact disc (CD) ROM 1100. The computer readable medium has stored thereon a computer program comprising program instructions. The computer program is loadable into a data processor (PROC; e.g., data processing circuitry or a data processing unit) 1120, which may, for example, be comprised in a server 1110. When loaded into the data processor, the computer program may be stored in a memory (MEM) 1130 associated with or comprised in the data processor. According to some embodiments, the computer program may, when loaded into and run by the data processor, cause execution of method steps according to, for example, any of the methods illustrated in FIGS. 1-3 and 6, or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A computer-implemented machine learning method for training of a neural network to perform a primary task, the method comprising:

determining the neural network to comprise one or more public parts and one or more confidential parts;

training a deployment instantiation of the neural network based on optimal performance of the primary task, and based on sub-optimal performance of the primary task conditioned on the confidential parts of the deployment instantiation being inaccessible; and training an adversary instantiation of the neural network based on optimal performance of the primary task conditioned on the public parts being identical for the deployment instantiation and for the adversary instantiation, and conditioned on the confidential parts of the deployment instantiation being inaccessible, wherein the training of the deployment instantiation and the training of the adversary instantiation are based on a plurality of training data samples, and are performed iteratively by alternating between the training of the deployment instantiation and the training of the adversary instantiation.

2. The method of claim 1, wherein performing the training of the deployment instantiation and the training of the adversary instantiation iteratively comprises, for each iteration:

updating the public and confidential parts of the deployment instantiation of the neural network based on a considered data sample from the plurality of training data samples and based on a current state of the adversary instantiation;

transferring the public parts of the deployment instantiation to the public parts of the adversary instantiation of the neural network; and updating parts of the adversary instantiation of the neural network that correspond to the confidential parts of the deployment instantiation based on the considered data sample.

3. The method of claim 1, wherein each of the training data samples comprises input data, first reference data, and second reference data, wherein:
the first reference data is for training of the deployment instantiation and the adversary instantiation and indicates optimal performance of the primary task for the input data, and
the second reference data is for training of the deployment instantiation and indicates random performance of the primary task for the input data.

4. The method of claim 1, wherein the one or more confidential parts comprises two or more confidential parts.

5. The method of claim 4, wherein a first confidential part of the one or more confidential parts precedes at least one first public part of the one or more public parts and a second confidential part of the one or more confidential parts is subsequent to the at least one first public part of the one or more public parts.

6. The method of claim 4, wherein each of the training data samples comprises a confidential key value associated with the confidential parts, wherein training of the deployment instantiation uses the confidential key value for the confidential parts, and wherein training of the adversary instantiation is conditioned on the confidential key value being inaccessible.

7. The method of claim 1, wherein the training comprises applying an optimization approach to an objective function conditioned on the plurality of training data samples.

8. The method of claim 7, wherein the objective function comprises at least first and second components, the first component indicating performance of the primary task as a function of settings for the public and confidential parts, and the second component indicating performance of the primary task as a function of settings for the public parts only.

9. The method of claim 6,
wherein the training comprises applying an optimization approach to an objective function conditioned on the plurality of training data samples;
wherein the objective function comprises at least first and second components, the first component indicating performance of the primary task as a function of settings for the public and confidential parts, and the second component indicating performance of the primary task as a function of settings for the public parts only; and
wherein the objective function further comprises a third component indicating a bias for settings of the confidential parts towards settings that depend on the confidential key value.

10. A method for deployment of an instantiation of a neural network trained in accordance with claim 1, the method comprising:
deploying the public parts of the instantiation in an un-trusted environment; and
deploying the confidential parts of the instantiation in a trusted environment.

11. The method of claim 10, further comprising deploying at least one instantiated key value associated with the confidential parts in the trusted environment.

12. A non-transitory computer readable medium, having thereon a computer program comprising program instructions, the computer program being loadable into a data processing unit and configured to cause execution of a method when the computer program is run by the data processing unit, wherein the method is a machine learning method for training of a neural network to perform a primary task, the method comprising:
determining the neural network to comprise one or more public parts and one or more confidential parts;
training a deployment instantiation of the neural network based on optimal performance of the primary task, and based on sub-optimal performance of the primary task conditioned on the confidential parts of the deployment instantiation being inaccessible; and
training an adversary instantiation of the neural network based on optimal performance of the primary task conditioned on the public parts being identical for the deployment instantiation and for the adversary instantiation, and conditioned on the confidential parts of the deployment instantiation being inaccessible,
wherein the training of the deployment instantiation and the training of the adversary instantiation are based on a plurality of training data samples, and are performed iteratively by alternating between the training of the deployment instantiation and the training of the adversary instantiation.

13. An apparatus for training of a neural network to perform a primary task, wherein the neural network is determined to comprise one or more public parts and one or more confidential parts, the apparatus comprising controlling circuitry configured to cause:
training of a deployment instantiation of the neural network based on optimal performance of the primary task, and based on sub-optimal performance of the primary task conditioned on the confidential parts of the deployment instantiation being inaccessible; and
training of an adversary instantiation of the neural network based on optimal performance of the primary task conditioned on the public parts being identical for the deployment instantiation and for the adversary instantiation, and conditioned on the confidential parts of the deployment instantiation being inaccessible,
wherein the controlling circuitry is configured to cause the training of the deployment instantiation and the training of the adversary instantiation to be performed iteratively based on a plurality of training data samples, by alternation between the training of the deployment instantiation and the training of the adversary instantiation.

14. The apparatus of claim 13, wherein iterative performance of the training of the deployment instantiation and the training of the adversary instantiation comprises, for each iteration:
updating of the public and confidential parts of the deployment instantiation of the neural network based on a considered data sample from the plurality of training data samples and based on a current state of the adversary instantiation;
transfer of the public parts of the deployment instantiation to the public parts of the adversary instantiation of the neural network; and
updating of parts of the adversary instantiation of the neural network that correspond to the confidential parts of the deployment instantiation based on the considered data sample.

15. The apparatus of claim 13, wherein each of the training data samples comprises input data, first reference data, and second reference data, wherein:
the first reference data is for training of the deployment instantiation and the adversary instantiation and indicates optimal performance of the primary task for the input data, and the second reference data is for training of the deployment instantiation and indicates random performance of the primary task for the input data.

16. The apparatus of claim 13, wherein the one or more confidential parts comprises two or more confidential parts.

17. The apparatus of claim 16, wherein a first confidential part of the one or more confidential parts precedes at least one first public part of the one or more public parts and a second confidential part of the one or more confidential parts is subsequent to the at least one first public part of the one or more public parts.

18. The apparatus of claim 16, wherein each of the training data samples comprises a confidential key value associated with the confidential parts, wherein training of the deployment instantiation uses the confidential key value for the confidential parts, and wherein training of the adversary instantiation is conditioned on the confidential key value being inaccessible.

19. The apparatus of claim 13, wherein the training comprises application of an optimization approach to an objective function conditioned on the plurality of training data samples.

20. The apparatus of claim 19, wherein the objective function comprises at least first and second components, the first component indicating performance of the primary task as a function of settings for the public and confidential parts, and the second component indicating performance of the primary task as a function of settings for the public parts only.

21. The apparatus of claim 18,
wherein the training comprises application of an optimization approach to an objective function conditioned on the plurality of training data samples;
wherein the objective function comprises at least first and second components, the first component indicating performance of the primary task as a function of settings for the public and confidential parts, and the second component indicating performance of the primary task as a function of settings for the public parts only; and
wherein the objective function further comprises a third component indicating a bias for settings of the confidential parts towards settings that depend on the confidential key value.

22. The apparatus of claim 13, wherein the controlling circuitry is further configured to cause determination of a split of the neural network into the one or more public parts and the one or more confidential parts.

23. An apparatus comprising:
one or more processors; and
a memory having stored therein an instantiation of a neural network trained in accordance with the method of claim 1.

24. An apparatus comprising:
one or more processors; and
a memory having stored therein the confidential parts of an instantiation of a neural network trained in accordance with the method of claim 1.

25. A computer server comprising the apparatus of claim 13.

26. A computer server system comprising a plurality of servers, the system being configured to perform the training of claim 1.

* * * * *